United States Patent Office 2,935,922
Patented May 10, 1960

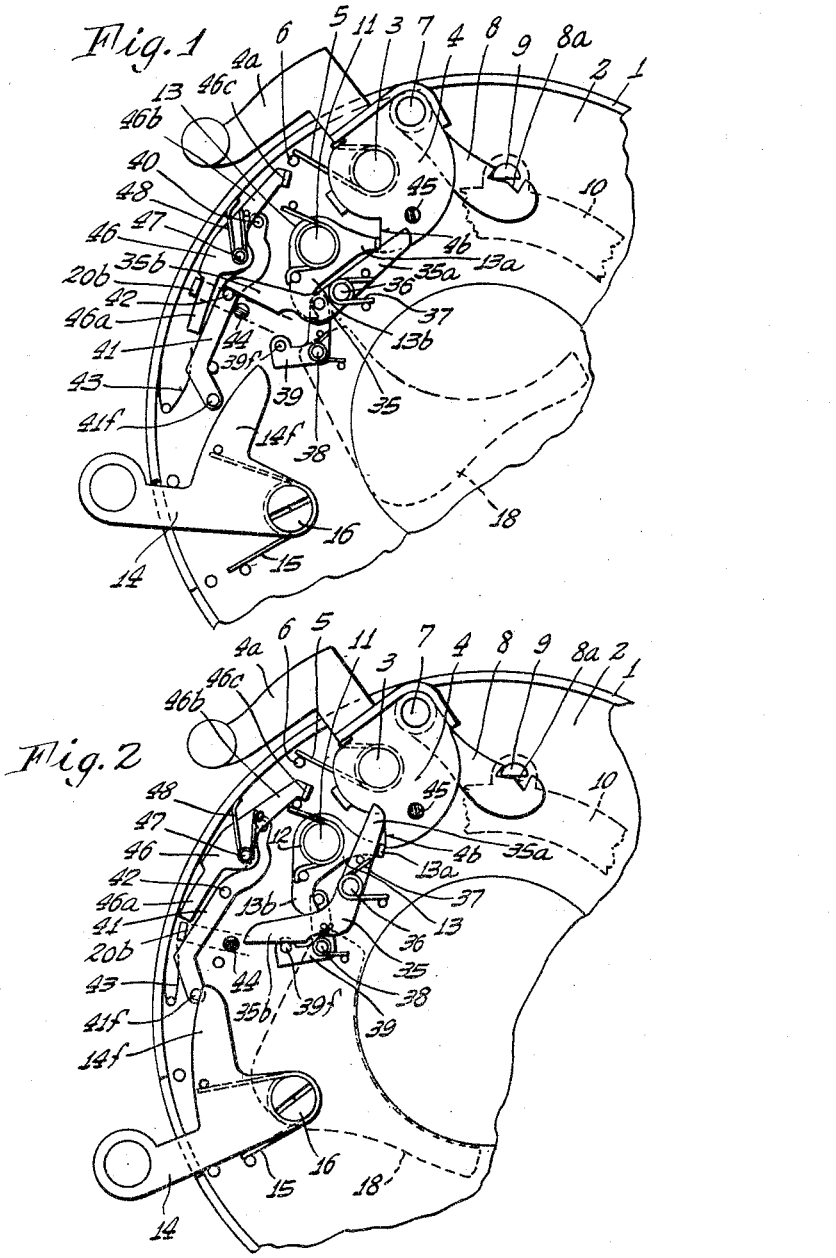

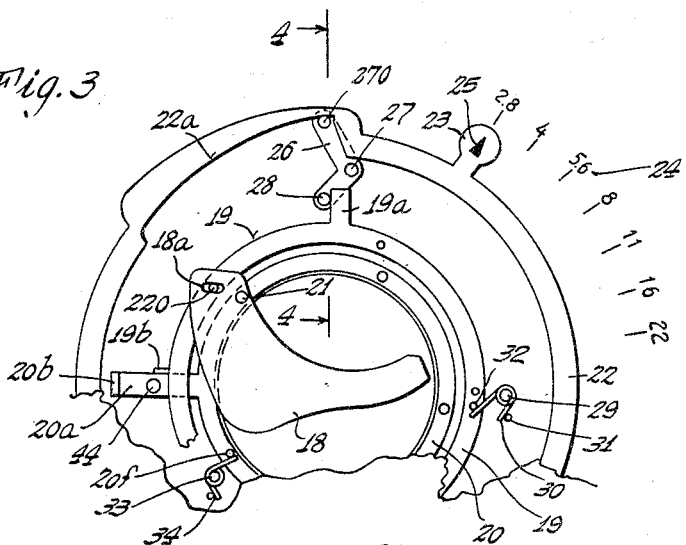
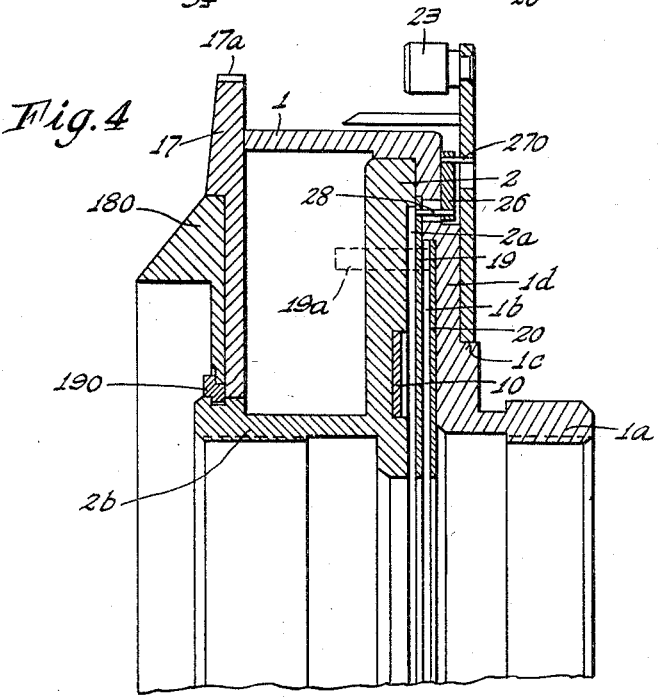

2,935,922

PHOTOGRAPHIC LENS SHUTTER

Waldemar T. Rentschler, Calmbach (Enz), Germany, assignor to Alfred Gauthier, G.m.b.H., Calmbach (Enz), Germany, a corporation of Germany Application July 9, 1957, Serial No. 670,782

Claims priority, application Germany July 10, 1956

16 Claims. (Cl. 95—64)

This invention relates to photographic lens shutter structures of the type wherein diaphragm blades are normally kept closed and are opened prior and closed subsequent to actuation of the shutter blades.

In shutter structures of the above type the diaphragm blades not only regulate the light admitting opening of the shutter but they additionally provide the advantage of more effectively and completely closing the shutter opening, to prevent undesired ingress of light. With such organization there is obviated the need for special or auxiliary coverings which normally require additional space and employ extra components involving additional cost.

Heretofore, in one type of shutter employing the above mechanism, the actuation and control of the diaphragm blades was done by a ring actuated by a drive spring, said ring and spring functioning to guide and shift the diaphragm blades to their open positions. The spring, being normally held captive, was released in response to actuation of the camera shutter or shutter release device, and caused the diaphragm actuating ring to shift in opening direction and strike an adjustable stop coordinated with a diaphragm scale. The closing of the diaphragm blades after the effecting of the exposure by the shutter blades was accomplished by the force of a spring which moves back the shutter release handle to its rest position, such force being applied to the diaphragm actuating ring to shift the latter closed against the action of the drive spring which opened the diaphragm blades. With such organization the retaining spring of the shutter or camera release handle, respectively, must be quite strong, and in the process of releasing the shutter, this strong spring which must be overcome causes what is known as a "hard release" in the camera. Such "hard release" is of considerable disadvantage, in that to actuate the same the operator often unavoidably moves or jumps the camera. A further disadvantage of this type of shutter structure is that the closing movement of the diaphragm blades depends on the actuation of the shutter release, and as a consequence it is not possible to make exposures with a delayed action device in structures where the shutter release is freed for movement immediately upon instigation of movement of the delayed action device, this occurring before the actual opening of the camera shutter.

The above drawbacks and disadvantages of these prior shutters as outlined are obviated by the present invention, and one object of the invention is to provide a novel and improved photographic shutter construction having automatic diaphragm blade actuation, wherein there is not needed any greater or increased force to effect actuation of the shutter release than is required with ordinary shutter structures of the type not employing automatically operated diaphragm blades.

In accomplishing this object there is provided by the invention a diaphragm blade actuating mechanism comprising a pair of discs or rings which are coaxially arranged with respect to the shutter axis and are turnable about the same, as well as with respect to each other. A first one of these discs or rings cooperates with a manually operable diaphragm aperture setting member, and the second one cooperates with a novel self-powered drive mechanism under the control of the shutter release handle.

The invention further provides for a relatively great movement of the setting member and a relatively small movement of the cooperating disc or ring of the diaphragm blade actuating mechanism, by the provision of a relatively long cam on the setting member, in conjunction with a cam follower drivingly connected with the said first ring.

By employing as the said cam follower a two-armed lever or bell crank an advantageous indirect connection may be effected which insures easy movement of the setting member and adaptability of the device to common shutter structures. In the specific embodiment of the invention set forth herein the bell crank abuts a part of the diaphragm ring and such abutting connection is maintained by a spring acting on the ring.

To effect proper closing of the diaphragm blades in a simple manner for all positions of the setting member, the second diaphragm ring is also spring charged but with a weaker spring than that acting on the first diaphragm ring, and both such rings are disposed in juxtaposed and superposed relation.

Further a pointer is provided on the setting member, adapted to cooperate with a fixedly mounted diaphragm scale, thereby to permit quick and easy adjustment of the member to effect the desired diaphragm opening.

In conjunction with such organization a simple and reliable actuation of the shutter and diaphragm blades is obtainable, by utilizing the shutter release mechanism to also release the driving device which is associated with the second diaphragm ring for the purpose of shifting the latter in blade-opening direction against the action of the said weaker spring.

By the invention, premature reclosing of the diaphragm blades is prevented after actuation of the shutter release mechanism, by the provision of an arresting device which releasably holds the second diaphragm ring in its blade-opening position.

In connection with such organization a "soft" and thus shock free release of the shutter of the camera may be effected, as well as the necessary synchronization of the shutter and diaphragm blades, by arranging the drive device which powers the second diaphragm ring so that it also unlatches or effects release of the cocked shutter blade drive mechanism after the arresting of the second diaphragm ring in its blade-opening position.

In conjunction with the above, the simplicity and reliability of the shutter structure may be enhanced by effecting simultaneous cocking of the shutter drive mechanism and also the diaphragm ring drive mechanism.

A simple construction by which this may be effected, and one saving of space, resides in making the diaphragm ring drive device in the form of a two-armed lever acting under the influence of a spring, one arm of said lever cooperating with the cocking manner of the shutter while the other arm thereof is adapted to actuate the release or unlatching of the cocked shutter blade drive mechanism.

The present improved construction also embraces the provision of a latching lever under the control of the shutter release handle, said latching lever releasably holding the two-armed driving lever in its cocked position.

A simple driving connection may be established between the two-armed drive lever and the second diaphragm ring by providing on the latter a driven lug or abutment projecting in the path of movement of the drive lever.

Further simplicity, reduction of components, and saving of space are effected by making the drive lever of resilient strip stock whereby its two arms may be flexed axially under suitable camming actions, thereby to effect a one-way drive connection with not only the second diaphragm ring but also the shutter driving member.

For effecting automatic return of the diaphragm blades to their closing positions in a simple and effective manner, the arresting device for the second diaphragm ring is actuated to render it inoperative by a part of the shutter blade drive mechanism, such actuation occurring at the end of the running-down movement of the shutter.

The arresting device may be advantageously constituted as a two-armed lever under the action of a spring, thereby to effect simplicity and a saving of space with a minimum number of components, one arm of the arresting lever constituting an abutment for maintaining open the second diaphragm ring whereas the second arm may be actuated by the shutter blade drive device for the purpose of rendering the arresting lever inoperative.

A specific embodiment of the invention is illustrated in the accompanying drawings, in which:

Figure 1 shows a top view of a portion of a photographic lens shutter constructed in accordance with the invention, the cover plate of the structure being omitted, and for the sake of clarity shutter components not important to the invention being left out. The shutter is shown in cocked position, with the diaphragm closed.

Fig. 2 illustrates the shutter of Fig. 1, with the shutter release handle actuated for effecting an exposure, the parts having the positions which they occupy directly before release of the shutter drive mechanism and after opening of the diaphragm blades.

Fig. 3 illustrates in top view a diaphragm blade and the diaphragm actuating mechanism as provided by the invention, and further illustrates the manually operable setting member for controlling the diaphragm openings.

Fig. 4 is a fragmentary longitudinal sectional view, enlarged, of the shutter structure as provided by the invention, such view being taken on line 4—4 of Fig. 3.

Referring to Figs. 1, 2, and 4 the housing of the shutter structure is indicated by the numeral 1. At the rear of the housing there is provided the usual nozzle 1a, for the purpose of holding the lens of the camera. The shutter housing 1 may be secured to the body of the camera in the usual manner, by the provision of external screw threads (not shown) on the nozzle 1a.

Within the housing 1 the shutter structure includes a fixed base plate 2 on which there is fixedly mounted a bearing 3 rotatably carrying a shutter driving and cocking member or disc 4 having a cocking lever or handle 4a, the latter projecting laterally from the housing 1 in the usual manner. Influencing the drive disc 4 is a shutter drive spring 5, having one end engaged with the disc 4 and its other end abutting a fixed pin 6 carried on the base plate 2.

The driving disc 4, hereinafter also called a spring-charged blade-driving means, has a pin or stud 7 on which there is mounted a driving latch 8 provided with a notch or mouth 8a which receives the pin 9 carried by the shutter blade ring 10, the latter being pivotally mounted in the well known manner at the rear of the base plate 2 and actuating the shutter blades of the camera (not shown) by the usual mechanism. As seen in Fig. 4, the usual space 2a exists at the rear of the base plate 2, to accommodate the shutter blade structures.

The cocking disc 4 may be latched in its cocked position by a two-armed or bell crank 13 biased in a counterclockwise direction by a spring 12, the lever 13 being carried by a pivot post 11 secured to the base plate 2. An arm 13a of the lever 13 cooperates with a nose 4b of the cocking disc 4, in the manner well known in the art. The lever 13 has a second arm 13b which is ultimately controlled, through a novel mechanism shortly to be described, by the shutter release lever 14, the latter being carried by a fixed post 16 secured to the base plate 2 and normally urged clock wise by a spring 15.

As seen in Fig. 4, the base plate 2 has a nozzle 2b, on which there is rotatably mounted a speed setting ring 17 having a knurled rim 17a for manual engagement, said speed setting ring being held in place by a front plate 180 and a threaded ring 190 carried by external threads on the nozzle 2b.

Still referring to Fig. 4 there is provided in the shutter housing 1 and adjacent the space 2a, a space 1b in which diaphragm blades (such as the blade 18 shown in Figs. 1, 2 and 3) may be disposed for movement between open and closed positions.

In accordance with this invention and referring now particularly to Fig. 3, the diaphragm blades 18 are mounted on two rings 19 and 20 (also hereinafter referred to as turnable members) arranged coaxially with respect to the shutter axis and turnable thereabout as well as with respect to each other. The first one of these rings, ring 19, cooperates with a manually operable setting member 22 shortly to be described, and the second ring 20 cooperates with a novel and improved, special driving mechanism which will be hereinafter brought out in great detail.

As seen in Fig. 4, in the specific embodiment of the invention illustrated herein the rings 19 and 20 are arranged between the shutter base plate 2 and the bottom wall 1d of the shutter housing 1. The diaphragm blades 18, see Fig. 3, are pivotally carried on pins 21 secured around the ring 20, and are connected with the ring 19 by means of pin-and-slot connections 18a and 220.

The setting ring 22 may be advantageously pivotally mounted on a shoulder 1c provided at the external of the rear housing wall 1d, said ring having a handle 23 provided with an index mark 25 cooperable with a diaphragm scale 24.

By the present invention I provide on the inner circumference of the ring 22 a camming edge 22a which is adapted to indirectly drive or actuate the diaphragm ring 19. For the purpose of effecting such drive within the space available and in a manner to insure easy movement of the ring 22 I provide, for cooperation with the cam 22a, a novel cam follower in the form of an angular lever or bell crank 26 pivotally carried by a pin 27 secured to the camera housing 1. The bell crank 26 has on one arm a follower pin 270 engaging the cam surface 22a and has on its other arm a pin 28 engageable with a lug or finger 19a on the ring 19. To maintain the follower pin 270 in engagement with the cam 22a, and to maintain the finger 19a in engagement with the pin 28 I provide a spring 30 carried by a pin 29 secured to the shutter housing, one end of such spring engaging a fixed pin 31 on the housing and the other end engaging a pin 32 carried by the diaphragm ring 19. The spring 30 thus continually urges the diaphragm ring 19 in a counterclockwise direction, maintaining the said engagement.

In accordance with the above construction an advantageous mechanical advantage is obtained by which a relatively great turning movement of the setting ring 22 will effect a much smaller turning movement of the diaphragm ring 19, and such rings may move in accordance with a given ratio, as will be readily understood. By virtue of the small movement which is imparted to the ring 19 for adjusting the diaphragm for different openings, an important advantage is obtained in that the driving mechanism for actuating the ring 20 may be greatly simplified, as will be later brought out. Moreover, by virtue of the relatively great movement made possible for the setting ring 22, the scale 24 cooperable therewith may be appreciably expanded, providing for easy readability and adjustment.

For the purpose of preventing opening movement of the diaphragm blades 18 during the setting of the ring 22, means are provided for causing such setting movement to effect simultaneous turning movement of both the rings 19 and 20. In accomplishing this, I provide a spring 34 about a fixed pin 33, said spring engaging a pin 20f on the ring 20 and normally urging said ring in a clockwise direction as viewed in Fig. 3. The ring 20 has an actuatable arm 20a extending laterally therefrom, said arm being engageable with a lug 19b provided on the ring 19 as shown, and the tendency for the spring 34 is to effect such engagement, whereby the diaphragm blades 18 remain closed. The spring 30 is weaker than the spring 34, and accordingly the latter will maintain at all times the driving connection between the finger 19a and the cam 22a, regardless of the opposing influence of the spring 34. The latter spring accordingly will normally tend to maintain the engagement between the parts 19b and 20a of the diaphragm rings, but will yield in response to counterclockwise actuation of the inner diaphragm ring 20, as by downward force applied to the arm 20a thereof. It will be understood that when the parts 19b and 20a remain engaged they will shift only a slight amount, simultaneously, in response to adjustment of the setting ring 22 over its entire scale.

It will be understood that any suitable detent means may be provided, in conjunction with the setting ring 22, to hold it in adjusted position.

In the present preferred embodiment of the invention the driving mechanism for the ring 20 is carried by the shutter base plate 2. In its operation the driving mechanism may be released or actuated by the shutter release handle 14, and upon such actuation it will drive the diaphragm ring 20 counterclockwise against the action of the spring 34, effecting an opening of the diaphragm blades 18. Accordingly there is achieved an automatic actuation of the diaphragm blades, obviating the necessity for special manual operation thereof, the automatic opening being carried out in a very simple and reliable manner. As will be later brought out, by such organization a soft action of the shutter release handle 14 is made possible, eliminating the likelihood of movement or jumping of the camera as an incident to release of the shutter.

For the purpose of effecting a closing movement of the diaphragm blades 18 which is independent of subsequent actuation of the shutter release handle 14 I provide a novel arresting device which becomes operative after the diaphragm ring 20 has shifted to open position, to maintain such position until after the camera shutter blades have been completely actuated. By this organization the present invention may be employed not only with ordinary shutter structures but also with shutter structures having delayed action devices, inasmuch as the automatic functioning of the present improved device makes it impossible to effect a faulty exposure as a consequence of inadvertent closing of the diaphragm blades prior to closing of the shutter blades.

In the present preferred embodiment of the invention I arrange the driving device for the diaphragm ring 20 in such a way that it is made to effect a release of the shutter blade driving mechanism only after the diaphragm ring 20 has been driven fully to its blade opening position. Accordingly, there is prevented any possibility of the shutter blades being opened prior to the diaphragm blades attaining their fully opened position.

Moreover, by this invention the drive device for the diaphragm ring 20 is arranged to be cocked simultaneously with cocking of the shutter driving disc 4, and there is thus obviated the necessity for an additional manual operation to effect cocking of the two separate drive mechanisms. Therefor, in the operation of the improved shutter structure there is had the greatest reliability and simplicity.

To effect the maximum simplicity, with the minimum number of components and with a minimum requirement of space, the driving mechanism for the diaphragm ring 20 is constituted as a two-armed lever 35 pivotally carried by a bearing pin 36 fixed on the shutter base plate 2. The lever 35 is spring-charged and urged in a counter-clockwise direction by a driving spring 37. One arm 35a of the lever 35 cooperates with the cocking disc 4 and the other arm 35b of the lever is arranged to actuate and drive the diaphragm ring 20 and also an angular lever 39 carried by a bearing post 38 on the base plate 2. The angular lever 39 cooperates with the locking or latching lever 13 which holds the driving disc 4 in its cocked position.

For the purpose of latching the driving lever 35 in the cocked position shown in Fig. 1 there is provided a one-armed latching lever 41, carried by a fixed pivot pin 40 secured to the base plate 2. The latching lever 41 is spring-charged counterclockwise by the provision of a spring 43 secured to the base plate 2, as shown in Figs. 1 and 2. The arm 35b of the driving lever 35 is arranged for engagement with a pin 42 carried by the lever 41, and it will be understood from an inspection of Fig. 1 that such pin latches the driving lever 35 in its cocked position and will release such driving lever upon the latching lever 41 being swung clockwise or to the left as shown in Fig. 2. To effect such clockwise movement of the latching lever 41, the latter is provided with a pin 41f engaged by an arm 14f on the shutter release handle 14, as shown.

For effecting a one-way drive between the arm 35b of the driving lever 35 and the arm 20a of the diaphragm ring 20, there is provided on the arm 20a an abutment pin 44 having a sloping or camming end face. A similar pin 45 having a sloping or camming end face is mounted on the driving disc 4, as part of a one-way driving connection between the disc 4 and the lever arm 35. The driving lever 35 is made of flexible strip or sheet material whereby the arms 35a and 35b thereof may flex laterally or axially, and this structure in conjunction with the camming end faces of the pins 44 and 45 enable a bypassing movement to occur, as follows: When the lever 35 is driven counterclockwise by the spring 36, the arm 35b of the lever will strike and drive before it the pin 44, and the ultimate positions of these components will be as shown in Fig. 2. However, with the pin 44 returned to its starting position as shown in Fig. 1 prior to return of the lever 35, this by-passing action may occur by virtue of the camming edge of the pin 44 flexing upward the arm 35b of the lever, thereby enabling said arm to bypass the pin and again regain its original driving position as shown in Fig. 1. Such return of the driving lever 35 is effected by engagement between the pin 45 on the disc 4 and the arm 35a, during the cocking movement of the disc. Accordingly a simultaneous cocking of the disc 4 and lever 35 occurs, in response to actuation of the cocking handle 4a. It will be observed from Fig. 2 that the driving, clockwise movement of the disc 4 will cause the camming face of the pin 45 to flex upward the lever arm 35a, thereby to enable the pin to bypass the arm during the said driving movement and prior to the next cocking operation The driving movement of the disc 4 also renders inoperative the arresting lever 46, and this effects a simple operation and structure, without requiring appreciable additional space.

As shown, the arresting device is constituted as a two-armed lever 46, pivotally carried by a pivot pin 47 fixed to the base 2. A spring 48 normally urges the lever 46 clockwise, and the arm 46a of the lever cooperates with a bent extremity or lug 20b of the ring arm 20a, whilst the arm 46b of the lever has a lug 46c intended to be struck and driven by the nose portion 4b of the driving disc 4 just prior to completion of the driving movement of such disc. To save space, the lever 46 is curved to fit it within the side wall of the housing, as shown.

Operation of the improved shutter structure as provided by the present invention is as follows:

(a) *Adjusting the diaphragm.*—Adjustment to obtain a desired diaphragm opening value is done in the well known manner, by setting the index mark 25 (Fig. 3) opposite to the number chosen on the diaphragm scale 24. This turns the ring 22 and shifts the cam 22a thereof, effecting a swinging of the lever 26.

As the ring 22 is adjusted in a direction to effect a smaller diaphragm aperture the lever 26 will be swung counterclockwise. This will result in a clockwise turning of the ring 19 against the action of the spring 30. Under the influence of the spring 34, the ring 20 will follow the ring 19 by virtue of the abutting connection 20a, 19b. This simultaneous turning movement of the two rings does not affect the closed condition of the diaphragm, but instead the entire diaphragm is merely turned slightly about the shutter axis.

Adjusting the ring 22 to a bigger diaphragm aperture, i.e. in the direction of the scale designation 2.8, causes an opposite turning of the rings 19 and 20. Ring 19 under the action of spring 30 and by virtue of the connection between the portions 19b and 20a, moves ring 20 in the same direction and by the same amount. Fig. 3 illustrates the positions of the rings 19 and 20 when set for the maximum diaphragm aperture of 2.8.

(b) *Cocking of the shutter.*—This is done in the well-known manner by actuating the cocking lever 4a in counterclockwise direction, thereby further tensioning the shutter drive spring 5. In addition, the pin 45 of the driving disc 4 is engaged with the arm 35a of the driving lever 35, thereby shifting the latter clockwise to its cocking positions, and further tensioning the drive spring 37. At the end of its movement, the lever 35 will have its arm 35b engaged behind the pin 42 of the arresting lever 41. Also, the cocking lever 13 will latch behind the nose 4b of the cocking disc 4, maintaining the latter in cocked position. Upon this being accomplished, the shutter and diaphragm driving mechanisms will be cocked, as clearly shown in Fig. 1.

(c) *Releasing the shutter.*—Release of the shutter is effected by shifting the shutter rerease lever or handle 14 counterclockwise. This first shifts the arresting lever 41 clockwise, releasing the driving lever 35, which latter now moves counterclockwise under the action of its spring 37. The arm 35b of the lever 35 strikes and drives ahead of it the pin 44 of the ring 20, thus turning the ring counterclockwise and opening the diaphragm to a pre-selected aperture value as determined by the position of the setting ring 22, such value being that indicated on the scale 24 by the index mark 25. As the above movement has proceeded, the lever arm 35b becomes disengaged from the pin 44 and the ring 20 is arrested and held against retrograde movement by engagement of the lug 20b on its arm 20a by the lever arm 46a of the arresting lever 46. Thus, the diaphragm blades 18 will be held in the desired opened positions.

During the further movement of the lever 35 the arm 35b thereof strikes a pin 39f on the lever 39, causing counterclockwise turning thereof and consequent clockwise turning of the latching lever 13, to the extent that the driving disc 4 is released. The driving latch 8 now actuates the shutter ring 10 to open and close the shutter blades as the disc 4 snaps clockwise through its driving arc.

At the termination of the closing movement of the shutter blades, the nose 4b of the disc 4 will strike the lug 46c of the arresting lever 46 shifting the latter counterclockwise and freeing the arm 46a thereof from the lug 20b of the ring 20. The spring 34 now returns the ring 20 to its starting position wherein the stops 19b and 20a of the rings are again engaged, resulting in closing of the diaphragm blades. It will now be understood that in accordance with the above construction I have provided a novel and improved photographic shutter structure by which the diaphragm blades provide an additional light guard while at the same time there is retained all of the desirable operating characteristics of shutters not provided with automatically actuated diaphragm blades.

I claim:

1. In a photographic lens shutter having cockable shutter blades and having diaphragm blades which latter remain closed in the normal cocked condition of the shutter and are opened to a pre-set value and again closed respectively prior and subsequent to actuation of the shutter blades, the improvement which comprises two individually turnable members coaxial with the shutter; positioning means including a yieldable part normally holding said members in a predetermined relative position; a manually operable setting member; means cooperable with one turnable member for adjustably shifting the same and consequently at the same time, in the same direction and through the same distance shifting the other turnable member in response to adjusting movement of the setting member; means coupling the turnable members to the diaphragm blades to actuate the latter for opening and closing movements in response to relative movement between the members; shutter release means for effecting release of the cocked shutter blades; a powered drive mechanism adapted to be cocked; means for cocking said mechanism prior to release of the cocked shutter by said shutter release means; means for releasing said powered drive mechanism in response to actuation of the shutter release means to release the cocked shutter; and means responsive to movement of the said drive mechanism, for actuating said other turnable member independently of the one turnable member to effect opening of the diaphragm blades prior to opening of the shutter blades.

2. The invention as defined in claim 1, in which the setting member has a cam and in which the means cooperable with the one turnable member includes a cam follower part engaged with said cam and having driving engagement with said one turnable member.

3. The invention as defined in claim 2 in which the cam follower part comprises a two-armed lever one arm of which engages said cam and the other arm of which engages said one turnable member, and in which there is a spring means maintaining said turnable member in engagement with said other arm.

4. The invention as defined in claim 3 in which the said positioning means include cooperable stops on the turnable members and spring means weaker than said first-mentioned spring means, engaging the said other turnable member and tending to bring and hold the said stops in engagement.

5. The invention as defined in claim 4 in which the shutter release means includes a manually operable shutter-release handle adapted to latch the powered drive mechanism in its starting position, said drive mechanism actuating said other turnable member against the action of said second-mentioned spring means.

6. The invention as defined in claim 5 in which there is an arresting device engageable with said other turnable member to releasably hold the same in its actuated, diaphragm-blade opening position.

7. The invention as defined in claim 6 in which there is a blade-driving means, operable after actuation of the shutter release means, for opening and thereafter reclosing said shutter blades, and in which there are means for rendering inoperative said arresting device after the shutter blades have been reclosed.

8. The invention as defined in claim 7 in which the means for rendering inoperative said arresting device includes a movable part engageable with said arresting device and constituting a portion of said shutter release means for effecting release of the cocked shutter blades.

9. The invention as defined in claim 8 in which the arresting device comprises a two-armed spring-charged lever one arm of which is engageable with said other turnable member and the other arm of which is engageable with said movable part.

10. The invention as defined in claim 1 in which there is a diaphragm scale related to the setting member.

11. The invention as defined in claim 1 in which the said powered drive mechanism is spring-charged, in which there is blade-driving means operable in response to actuation of the shutter release, and in which there are means for simultaneously cocking the blade-driving means and said powered drive mechanism.

12. The invention as defined in claim 11 in which there is a latch means for latching said blade-driving means in cocked position, and in which the said powered drive mechanism comprises a two-armed lever one arm of which cooperates with the said blade-driving means, the other arm of which is engageable with said other turnable member and with said latch means.

13. The invention as defined in claim 12 in which the shutter release means includes a manually operable handle and a latching lever actuated thereby, for latching said two-armed lever in its starting position, said latching lever engaging the said other arm of the two-armed lever.

14. The invention as defined in claim 13 in which the said other turnable member has an abutment lug adapted to be struck and driven by the said other arm of the two-armed lever.

15. The invention as defined in claim 12 in which the two-armed lever is constituted of a resilient strip the arms of which may be deflected axially of the lever for bypassing a portion of said other turnable member and a portion of said blade-driving means.

16. In a photographic lens shutter having cockable shutter blades and having diaphragm blades which latter remain closed in the normal cocked condition of the shutter and are opened to a pre-set value and again closed respectively prior and subsequent to actuation of the shutter blades, the improvement which comprises two individually turnable members coaxial with the shutter, said diaphragm blades being connected to both of said turnable members at spaced points on said diaphragm members, a manually operable setting member, means for adjustably shifting one of said turnable members in response to adjusting movement of the setting member, said individually turnable members having a normal relationship with respect to each other wherein said diaphragm blades are in closed association with each other, means for retaining the other of said turnable members in said normal relationship to said one of said members as said one of said turnable members is shifted in response to said adjusting movement, said turnable members being movable with respect to each other to actuate the diaphragm blades to open position and to closed position, means for effecting opening of the shutter blades including a power driving member having an initial movement independent of the shutter blade movement and means responsive to said initial movement of the driving member to effect relative movement of the turnable members and opening of the diaphragm blades prior to opening of the shutter blades.

References Cited in the file of this patent

UNITED STATES PATENTS

| | | |
|---|---|---|
| 2,340,573 | Aiken | Feb. 1, 1944 |
| 2,380,610 | Pignone | July 31, 1945 |
| 2,384,615 | Fuerst | Sept. 11, 1945 |
| 2,472,580 | Fuerst | June 7, 1949 |